(12) United States Patent
Maekawa et al.

(10) Patent No.: US 12,131,412 B2
(45) Date of Patent: Oct. 29, 2024

(54) HEAD-UP DISPLAY DEVICE

(71) Applicant: Mazda Motor Corporation, Hiroshima (JP)

(72) Inventors: Mitsuaki Maekawa, Aki-gun (JP); Hidenobu Nakashima, Aki-gun (JP); Kazuna Kaneshige, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 184 days.

(21) Appl. No.: 17/750,418

(22) Filed: May 23, 2022

(65) Prior Publication Data

US 2022/0383567 A1    Dec. 1, 2022

(30) Foreign Application Priority Data

Jun. 1, 2021 (JP) ................... 2021-092142

(51) Int. Cl.
| | |
|---|---|
| *G06T 11/20* | (2006.01) |
| *G02B 27/01* | (2006.01) |
| *G09G 3/00* | (2006.01) |
| *B60K 35/00* | (2006.01) |
| *B60K 35/23* | (2024.01) |
| *B60K 35/28* | (2024.01) |

(52) U.S. Cl.
CPC ........ *G06T 11/203* (2013.01); *G02B 27/0101* (2013.01); *G09G 3/001* (2013.01); *B60K 35/00* (2013.01); *B60K 35/23* (2024.01); *B60K 35/28* (2024.01); *B60K 2360/166* (2024.01); *G09G 2380/10* (2013.01)

(58) Field of Classification Search
CPC ... G06T 11/203; G02B 27/0101; G02B 27/01; G09G 3/001; G09G 2380/10; B60K 35/28; B60K 35/23; B60K 2360/166; B60K 35/00; B60K 35/29; B60K 2360/177; B60K 2360/179; B60K 2360/1868
See application file for complete search history.

(56) References Cited

U.S. PATENT DOCUMENTS 5,883,739 A * 3/1999 Ashihara ............... H04N 13/239
348/E13.043
6,405,131 B1 * 6/2002 Barton ............... G01C 21/3626
340/988

(Continued)

FOREIGN PATENT DOCUMENTS

DE  10 2016 123311 A1  6/2017
EP     2 827 103 A1     1/2015

(Continued)

*Primary Examiner* — Charles L Beard
(74) *Attorney, Agent, or Firm* — XSENSUS LLP (57) ABSTRACT

A head-up display device that is configured to allow a driver to intuitively recognize a plurality of objects sequentially along a travel route of a vehicle while projecting a video onto an image forming plane that has a length in the vertical direction shorter than a length in the horizontal direction. An optical processor of the head-up display device obtains from a controller a first image signal based on the nearest road sign information and a second image signal based on the following road sign information along the travel route. The optical processor causes line segment objects as well as information objects generated from the first image signal and the second image signal, respectively, to be displayed on an image forming plane.

12 Claims, 6 Drawing Sheets

(56) References Cited

U.S. PATENT DOCUMENTS

| | | | | |
|---|---|---|---|---|
| 6,434,482 B1* | 8/2002 | Oshida | G01C 21/3679 | 701/426 |
| 6,453,234 B1* | 9/2002 | Noguchi | G01C 21/3688 | 73/178 R |
| 9,731,720 B2* | 8/2017 | Seo | B60W 30/18 | |
| 9,733,100 B2* | 8/2017 | Milicic | G01C 21/3658 | |
| 9,746,668 B2* | 8/2017 | Kim | G02B 27/0101 | |
| 9,809,165 B1* | 11/2017 | Misu | G06V 20/597 | |
| 9,987,926 B2* | 6/2018 | Cho | G01C 21/3697 | |
| 10,217,357 B1* | 2/2019 | Elsheemy | G08G 1/09623 | |
| 10,282,915 B1* | 5/2019 | Lin | G02B 27/01 | |
| 10,338,383 B2* | 7/2019 | Leda | G08G 1/0967 | |
| 10,661,790 B2* | 5/2020 | Kang | B60W 10/20 | |
| 10,800,328 B2* | 10/2020 | Takazawa | G08G 1/165 | |
| 11,059,421 B2* | 7/2021 | Ostapenko | B60W 30/143 | |
| 11,169,377 B1* | 11/2021 | Chen | G02B 27/0101 | |
| 11,682,357 B1* | 6/2023 | Seo | G09G 3/342 | 345/694 |
| 11,697,346 B1* | 7/2023 | Weiss | G08G 1/167 | 345/589 |
| 11,766,938 B1* | 9/2023 | Weiss | G06V 10/60 | 345/589 |
| 12,043,275 B2* | 7/2024 | Seitz | G06V 20/588 | |
| 2001/0027377 A1* | 10/2001 | Shimabara | G01C 21/3658 | 701/437 |
| 2002/0010543 A1* | 1/2002 | Watanabe | G01C 21/3608 | 701/438 |
| 2003/0050756 A1* | 3/2003 | McGovern | G01C 21/3632 | 340/990 |
| 2005/0143911 A1* | 6/2005 | Ishibashi | G01C 21/3658 | 701/423 |
| 2005/0154505 A1* | 7/2005 | Nakamura | G02B 27/01 | 701/1 |
| 2005/0171688 A1* | 8/2005 | Fujita | G01C 21/3658 | 340/995.27 |
| 2005/0273252 A1* | 12/2005 | Nix | G01C 21/3632 | 340/995.16 |
| 2009/0005961 A1* | 1/2009 | Grabowski | G02B 27/01 | 701/532 |
| 2009/0216431 A1* | 8/2009 | Vu | G01C 21/3655 | 701/533 |
| 2010/0164702 A1* | 7/2010 | Sasaki | G02B 27/01 | 345/7 |
| 2010/0250116 A1* | 9/2010 | Yamaguchi | G01C 21/3647 | 701/533 |
| 2010/0253493 A1* | 10/2010 | Szczerba | G02B 27/01 | 345/593 |
| 2010/0253595 A1* | 10/2010 | Szczerba | G02B 27/01 | 701/31.4 |
| 2010/0253598 A1* | 10/2010 | Szczerba | G06V 10/806 | 701/532 |
| 2010/0289632 A1* | 11/2010 | Seder | G06V 10/95 | 382/104 |
| 2011/0001639 A1* | 1/2011 | Sasaki | G02B 27/0101 | 340/425.5 |
| 2011/0052042 A1* | 3/2011 | Ben Tzvi | G06V 20/56 | 382/154 |
| 2011/0109475 A1* | 5/2011 | Basnayake | G08G 1/096791 | 340/902 |
| 2011/0279452 A1* | 11/2011 | Ibe | G09B 29/007 | 345/419 |
| 2012/0170130 A1* | 7/2012 | Sasaki | B60K 35/00 | 359/630 |
| 2012/0223845 A1* | 9/2012 | Schumann | B60K 35/00 | 340/995.19 |
| 2012/0224060 A1* | 9/2012 | Gurevich | G06V 20/582 | 348/148 |
| 2012/0224062 A1* | 9/2012 | Lacoste | G09G 5/14 | 348/148 |
| 2012/0249589 A1* | 10/2012 | Gassner | G02B 27/01 | 345/633 |
| 2012/0268351 A1* | 10/2012 | Sasaki | G01C 21/365 | 345/8 |
| 2014/0267402 A1* | 9/2014 | Hing | G02B 27/0101 | 359/630 |
| 2014/0354692 A1* | 12/2014 | Ng-Thow-Hing | G02B 27/0101 | 345/633 |
| 2015/0293354 A1* | 10/2015 | Oishi | G08G 1/095 | 345/7 |
| 2015/0331487 A1* | 11/2015 | Roth | G01C 21/365 | 345/156 |
| 2016/0003636 A1* | 1/2016 | Ng-Thow-Hing | G01C 21/365 | 701/418 |
| 2016/0052394 A1* | 2/2016 | Yamada | B60W 60/0059 | 701/93 |
| 2016/0167514 A1* | 6/2016 | Nishizaki | G09G 3/002 | 345/7 |
| 2016/0170487 A1* | 6/2016 | Saisho | G01C 21/3697 | 345/156 |
| 2016/0252363 A1* | 9/2016 | Tertoolen | G01C 21/367 | 701/410 |
| 2016/0266390 A1* | 9/2016 | Seo | G09G 3/001 | |
| 2016/0313562 A1* | 10/2016 | Saisho | G09G 5/38 | |
| 2016/0327402 A1* | 11/2016 | Funabiki | G08G 1/0969 | |
| 2016/0334623 A1* | 11/2016 | Kishi | G09G 5/005 | |
| 2016/0347324 A1* | 12/2016 | Yoshitomi | B60K 35/00 | |
| 2016/0355133 A1* | 12/2016 | Kim | G06F 3/04883 | |
| 2016/0365068 A1* | 12/2016 | Sakaguchi | B60K 35/00 | |
| 2017/0053444 A1* | 2/2017 | Huang | G06F 3/0485 | |
| 2017/0080952 A1* | 3/2017 | Gupta | G08G 1/167 | |
| 2017/0154554 A1* | 6/2017 | Tanaka | G06V 20/588 | |
| 2017/0160552 A1* | 6/2017 | Muramatsu | G02B 27/01 | |
| 2017/0161009 A1* | 6/2017 | Ogisu | B60K 35/00 | |
| 2017/0177957 A1* | 6/2017 | Yokochi | B60K 35/00 | |
| 2017/0178507 A1* | 6/2017 | Yokochi | G08G 1/096716 | |
| 2017/0187963 A1* | 6/2017 | Lee | G01C 21/365 | |
| 2017/0235135 A1* | 8/2017 | Ishiguro | G06T 11/60 | 345/633 |
| 2017/0240185 A1* | 8/2017 | Li | G08B 7/06 | |
| 2017/0241788 A1* | 8/2017 | Chin | G01C 21/343 | |
| 2017/0253181 A1* | 9/2017 | Choi | G09G 3/02 | |
| 2017/0254659 A1* | 9/2017 | Fukumoto | B60K 35/00 | |
| 2017/0276938 A1* | 9/2017 | Nakashima | G08G 1/166 | |
| 2017/0305365 A1* | 10/2017 | Matsumoto | G08G 1/0962 | |
| 2017/0329143 A1* | 11/2017 | Svarichevsky | G02B 27/0101 | |
| 2017/0334455 A1* | 11/2017 | Asakura | B60J 3/04 | |
| 2017/0334460 A1* | 11/2017 | Arakawa | B60W 30/18163 | |
| 2017/0336222 A1* | 11/2017 | Yamaguchi | G02B 27/0101 | |
| 2017/0336629 A1* | 11/2017 | Suzuki | G08G 1/166 | |
| 2018/0023970 A1* | 1/2018 | Iguchi | G01C 21/365 | 345/7 |
| 2018/0090002 A1* | 3/2018 | Arita | G06F 3/00 | |
| 2018/0091085 A1* | 3/2018 | Tamagaki | B60W 50/14 | |
| 2018/0118223 A1* | 5/2018 | Mori | B60K 35/00 | |
| 2018/0147988 A1* | 5/2018 | Lee | G08G 1/0133 | |
| 2018/0148072 A1* | 5/2018 | Kamiya | B60W 50/14 | |
| 2018/0164115 A1* | 6/2018 | Chiu | G01C 21/3602 | |
| 2018/0180879 A1* | 6/2018 | Yamaguchi | G06V 20/56 | |
| 2018/0218603 A1* | 8/2018 | Torii | G01C 21/365 | |
| 2018/0306597 A1* | 10/2018 | Kosaka | G09G 5/377 | |
| 2018/0326996 A1* | 11/2018 | Fujisawa | B60W 50/085 | |
| 2018/0350236 A1* | 12/2018 | Yamaguchi | G08G 1/09626 | |
| 2018/0352164 A1* | 12/2018 | Higuchi | G03B 21/14 | |
| 2018/0370567 A1* | 12/2018 | Rowell | B60K 35/00 | |
| 2018/0373027 A1* | 12/2018 | Higuchi | G09G 3/346 | |
| 2018/0373030 A1* | 12/2018 | Kusanagi | B60R 11/02 | |
| 2019/0005726 A1* | 1/2019 | Nakano | G06T 19/006 | |
| 2019/0005727 A1* | 1/2019 | Tanaka | G06V 20/588 | |
| 2019/0011712 A1* | 1/2019 | Nagano | G09G 5/38 | |
| 2019/0025577 A1* | 1/2019 | Tamura | B60K 35/00 | |
| 2019/0025580 A1* | 1/2019 | Nagano | H04N 9/3185 | |
| 2019/0049724 A1* | 2/2019 | Kimura | G09G 3/001 | |
| 2019/0061529 A1* | 2/2019 | Saisho | G08G 1/0968 | |
| 2019/0064531 A1* | 2/2019 | Wakatsuki | G02B 27/0179 | |
| 2019/0080496 A1* | 3/2019 | Wakatsuki | G02B 27/0101 | |
| 2019/0084419 A1* | 3/2019 | Suzuki | G09G 3/03 | |
| 2019/0139286 A1* | 5/2019 | Shimoda | B60K 35/23 | |

(56) References Cited

U.S. PATENT DOCUMENTS

| | | | | |
|---|---|---|---|---|
| 2019/0144004 | A1* | 5/2019 | Mimura | G01C 21/3635 701/28 |
| 2019/0168610 | A1* | 6/2019 | Nakane | H04N 5/66 |
| 2019/0178669 | A1* | 6/2019 | Lee | B60K 35/00 |
| 2019/0204827 | A1* | 7/2019 | Bhalla | G05D 1/0061 |
| 2019/0226866 | A1* | 7/2019 | Chang | G06V 20/20 |
| 2019/0244553 | A1* | 8/2019 | Irzyk | B60K 35/00 |
| 2019/0275888 | A1* | 9/2019 | Kirsch | B60K 35/22 |
| 2019/0283770 | A1* | 9/2019 | Kubota | B60W 50/082 |
| 2019/0295508 | A1* | 9/2019 | Tsuji | G09G 3/003 |
| 2019/0308641 | A1* | 10/2019 | Sato | B60K 35/23 |
| 2019/0315374 | A1* | 10/2019 | Oh | B60W 50/16 |
| 2019/0329716 | A1* | 10/2019 | Kubota | B60K 35/00 |
| 2019/0339519 | A1* | 11/2019 | Toki | G06F 3/147 |
| 2019/0389366 | A1* | 12/2019 | Sorokin | G03B 21/2033 |
| 2019/0391392 | A1* | 12/2019 | Ogata | B60K 35/28 |
| 2020/0005636 | A1* | 1/2020 | Haltakov | G08G 1/09626 |
| 2020/0012103 | A1* | 1/2020 | Kasazumi | G02B 27/0101 |
| 2020/0031393 | A1* | 1/2020 | Hirota | G02B 27/0101 |
| 2020/0049983 | A1* | 2/2020 | Higashiyama | G09G 5/37 |
| 2020/0051529 | A1* | 2/2020 | Higashiyama | B60K 35/10 |
| 2020/0051531 | A1* | 2/2020 | Higashiyama | G09G 5/10 |
| 2020/0062276 | A1* | 2/2020 | Yuan | B60K 35/22 |
| 2020/0064629 | A1* | 2/2020 | Yamashita | G01C 21/36 |
| 2020/0080864 | A1* | 3/2020 | Ichinokawa | G01C 21/3658 |
| 2020/0082725 | A1* | 3/2020 | Ichinokawa | B60W 50/14 |
| 2020/0090375 | A1* | 3/2020 | Mori | G02B 27/01 |
| 2020/0105224 | A1* | 4/2020 | Higashiyama | H04N 9/3182 |
| 2020/0116518 | A1* | 4/2020 | Lee | G06F 3/013 |
| 2020/0118310 | A1* | 4/2020 | Matsumoto | G06V 20/586 |
| 2020/0124849 | A1* | 4/2020 | Tsuji | G06F 3/1454 |
| 2020/0124851 | A1* | 4/2020 | Higashiyama | G02B 27/0101 |
| 2020/0139813 | A1* | 5/2020 | Lee | G02B 27/0101 |
| 2020/0148059 | A1* | 5/2020 | Iijima | B60W 50/0098 |
| 2020/0168180 | A1* | 5/2020 | Ichinokawa | B60K 35/00 |
| 2020/0197791 | A1* | 6/2020 | Iwasaki | A63F 13/219 |
| 2020/0209618 | A1* | 7/2020 | Lee | G02B 5/02 |
| 2020/0217686 | A1* | 7/2020 | Koh | G08G 1/0965 |
| 2020/0218076 | A1* | 7/2020 | Yamada | B60K 35/53 |
| 2020/0262332 | A1* | 8/2020 | Alhanbali, Sr. | G06V 20/588 |
| 2020/0269759 | A1* | 8/2020 | Watanabe | B60R 1/001 |
| 2020/0282832 | A1* | 9/2020 | Watanabe | H04N 7/18 |
| 2020/0369149 | A1* | 11/2020 | Kassner | G08G 1/165 |
| 2020/0369150 | A1* | 11/2020 | Nakajima | G01C 21/367 |
| 2020/0400455 | A1* | 12/2020 | Wakayanagi | G08G 1/16 |
| 2020/0406754 | A1* | 12/2020 | Kassner | B60K 35/00 |
| 2021/0003414 | A1* | 1/2021 | Yamaguchi | G06F 3/04817 |
| 2021/0008981 | A1* | 1/2021 | Suzuki | G02B 27/01 |
| 2021/0019867 | A1* | 1/2021 | Hayashi | H04N 9/3194 |
| 2021/0039715 | A1* | 2/2021 | Ferrer | G06V 20/58 |
| 2021/0048308 | A1* | 2/2021 | Ido | G01C 21/3658 |
| 2021/0049985 | A1* | 2/2021 | Kusanagi | G09G 5/38 |
| 2021/0063185 | A1* | 3/2021 | Kawai | G01C 21/3635 |
| 2021/0078407 | A1* | 3/2021 | Kim | G01C 21/3658 |
| 2021/0078503 | A1* | 3/2021 | Horihata | G09G 5/22 |
| 2021/0088351 | A1* | 3/2021 | Kassner | G02B 27/017 |
| 2021/0095981 | A1* | 4/2021 | Sumikawa | G01C 21/3626 |
| 2021/0104212 | A1* | 4/2021 | Horihata | G06F 3/14 |
| 2021/0107356 | A1* | 4/2021 | Watanabe | G06V 20/20 |
| 2021/0129766 | A1* | 5/2021 | Kim | B60R 1/24 |
| 2021/0155159 | A1* | 5/2021 | Kawate | B60K 35/00 |
| 2021/0156695 | A1* | 5/2021 | Zhang | G06T 19/006 |
| 2021/0165220 | A1* | 6/2021 | Nakada | B60W 40/08 |
| 2021/0206316 | A1* | 7/2021 | Mochizuki | G08G 1/09626 |
| 2021/0215499 | A1* | 7/2021 | Kassner | G01C 21/3415 |
| 2021/0223058 | A1* | 7/2021 | Horihata | G01C 21/3635 |
| 2021/0237754 | A1* | 8/2021 | Shiba | B60K 35/28 |
| 2021/0260999 | A1* | 8/2021 | Masuya | G02B 26/0816 |
| 2021/0268961 | A1* | 9/2021 | Asami | G08G 1/166 |
| 2021/0291684 | A1* | 9/2021 | Takahashi | B60L 58/12 |
| 2021/0300183 | A1* | 9/2021 | Kondo | G02B 27/0101 |
| 2021/0309242 | A1* | 10/2021 | Hayakawa | B60K 35/654 |
| 2021/0323403 | A1* | 10/2021 | Yamaguchi | B60K 31/185 |
| 2021/0323404 | A1* | 10/2021 | Kwon | G01C 21/3644 |
| 2021/0323405 | A1* | 10/2021 | Kwon | G01C 21/3638 |
| 2021/0331588 | A1* | 10/2021 | Sung | G06V 20/20 |
| 2021/0341306 | A1* | 11/2021 | He | G01C 21/3697 |
| 2021/0341737 | A1* | 11/2021 | Horihata | G06V 20/20 |
| 2021/0372803 | A1* | 12/2021 | van der Vlist | G01C 21/3461 |
| 2021/0372810 | A1* | 12/2021 | Hato | G09G 5/38 |
| 2021/0389596 | A1* | 12/2021 | Fujita | G02B 27/0101 |
| 2021/0390926 | A1* | 12/2021 | Kunze | G08G 1/165 |
| 2021/0393206 | A1* | 12/2021 | Kusanagi | G06F 3/14 |
| 2022/0013046 | A1* | 1/2022 | Mori | G02B 30/27 |
| 2022/0036598 | A1* | 2/2022 | Kim | G06F 3/147 |
| 2022/0058885 | A1* | 2/2022 | Lee | G06T 19/006 |
| 2022/0058998 | A1* | 2/2022 | Yagyu | G06T 7/70 |
| 2022/0075183 | A1* | 3/2022 | Lee | B60K 35/10 |
| 2022/0080827 | A1* | 3/2022 | Sung | B60W 30/095 |
| 2022/0080828 | A1* | 3/2022 | Sung | B60K 35/23 |
| 2022/0084262 | A1* | 3/2022 | Sung | B60K 35/23 |
| 2022/0084458 | A1* | 3/2022 | Sakuma | G09G 3/2096 |
| 2022/0099968 | A1* | 3/2022 | Satoh | G02B 27/0012 |
| 2022/0101611 | A1* | 3/2022 | Lee | G02B 27/0101 |
| 2022/0107201 | A1* | 4/2022 | Yagyu | G08G 1/0968 |
| 2022/0107497 | A1* | 4/2022 | Murata | B60K 35/29 |
| 2022/0118983 | A1* | 4/2022 | Yagyu | B62D 15/025 |
| 2022/0130296 | A1* | 4/2022 | Kamiya | B60W 50/16 |
| 2022/0135061 | A1* | 5/2022 | Seitz | B60K 35/00 701/26 |
| 2022/0144083 | A1* | 5/2022 | Seitz | B60K 35/00 |
| 2022/0144087 | A1* | 5/2022 | Takemori | B60K 35/00 |
| 2022/0172652 | A1* | 6/2022 | Yagyu | G09G 3/001 |
| 2022/0212689 | A1* | 7/2022 | Nakao | B60W 50/14 |
| 2022/0227384 | A1* | 7/2022 | Wyszka | B62D 15/025 |
| 2022/0228881 | A1* | 7/2022 | Im | G01C 21/365 |
| 2022/0242238 | A1* | 8/2022 | Choi | G08G 1/167 |
| 2022/0242435 | A1* | 8/2022 | Mihara | B60K 35/00 |
| 2022/0250543 | A1* | 8/2022 | Szczerba | B60W 30/143 |
| 2022/0262254 | A1* | 8/2022 | Mizobata | B60K 35/60 |
| 2022/0289228 | A1* | 9/2022 | Yamamoto | B60W 30/18163 |
| 2022/0301116 | A1* | 9/2022 | Imatoh | G06T 5/73 |
| 2022/0317443 | A1* | 10/2022 | Matsui | G06V 20/588 |
| 2022/0319316 | A1* | 10/2022 | Sakurada | G08G 1/095 |
| 2022/0355665 | A1* | 11/2022 | Matsunobu | G02B 27/0093 |
| 2022/0363251 | A1* | 11/2022 | Shin | B60K 35/00 |
| 2022/0410922 | A1* | 12/2022 | Koh | B60W 50/16 |
| 2022/0415224 | A1* | 12/2022 | Kim | G09G 3/002 |
| 2022/0415321 | A1* | 12/2022 | Jung | G06F 3/167 |
| 2023/0009636 | A1* | 1/2023 | Zhang | B60K 35/00 |
| 2023/0013965 | A1* | 1/2023 | Miyake | G01C 21/365 |
| 2023/0022485 | A1* | 1/2023 | Fujita | G06T 11/203 |
| 2023/0026137 | A1* | 1/2023 | Kusafuka | H04N 13/324 |
| 2023/0036783 | A1* | 2/2023 | Sakuma | G02B 27/0101 |
| 2023/0058898 | A1* | 2/2023 | Yamada | B60K 35/00 |
| 2023/0060810 | A1* | 3/2023 | Hamabe | B60K 35/23 |
| 2023/0069348 | A1* | 3/2023 | Park | G02B 27/0179 |
| 2023/0106909 | A1* | 4/2023 | Ogata | G09G 3/002 701/437 |
| 2023/0114559 | A1* | 4/2023 | Ikemoto | G06F 3/013 345/156 |
| 2023/0115930 | A1* | 4/2023 | Scheffler-Juschtschenko | G02B 27/0101 359/630 |
| 2023/0196953 | A1* | 6/2023 | Tanaka | G09B 29/00 345/649 |
| 2023/0221569 | A1* | 7/2023 | Ohyama | B60K 35/00 701/523 |
| 2023/0228589 | A1* | 7/2023 | Ryu | B60K 35/00 701/400 |
| 2023/0286509 | A1* | 9/2023 | Kume | B60W 60/0051 |
| 2023/0288195 | A1* | 9/2023 | Rajavenkatanarayanan | G01B 21/26 |
| 2023/0294517 | A1* | 9/2023 | Ito | B60K 35/22 701/36 |
| 2023/0304822 | A1* | 9/2023 | Lee | G06V 20/20 |
| 2023/0314157 | A1* | 10/2023 | Weiss | G06F 3/011 345/423 |
| 2023/0356588 | A1* | 11/2023 | Oki | G09G 5/36 |
| 2023/0373309 | A1* | 11/2023 | Kume | B60K 35/22 |
| 2023/0398868 | A1* | 12/2023 | Park | G01C 21/3647 |
| 2023/0399004 | A1* | 12/2023 | Lee | G01C 21/365 |
| 2023/0400320 | A1* | 12/2023 | Choi | G06V 20/20 |

(56) References Cited

U.S. PATENT DOCUMENTS

| | | | | |
|---|---|---|---|---|
| 2023/0400321 A1* | 12/2023 | Lee | ........................ | B60K 35/00 |
| 2024/0001762 A1* | 1/2024 | Hotta | ...................... | B60K 35/00 |
| 2024/0003702 A1* | 1/2024 | Hotta | .................... | G01C 21/365 |
| 2024/0101138 A1* | 3/2024 | Hada | ...................... | B60K 35/00 |

FOREIGN PATENT DOCUMENTS

| | | | |
|---|---|---|---|
| JP | 2010-105443 | A | 5/2010 |
| JP | 6354633 | B2 | 7/2018 |

\* cited by examiner

HEAD-UP DISPLAY DEVICE

CROSS-REFERENCE TO RELATED APPLICATION

The present application claims priority to Japanese application number 2021-092142 filed in the Japanese Patent Office on Jun. 1, 2021, the entire contents of both of which being incorporated herein by reference.

TECHNICAL FIELD

The present disclosure relates to a head-up display device.

BACKGROUND

A head-up display device is a device that projects objects related to various types of driving-related information onto an image forming plane ahead of a driver seat. A vehicle with a head-up display device allows a driver to recognize various types of driving-related information without requiring him/her to look away from his/her viewpoint.

Patent Literature 1 discloses a head-up display device that projects objects related to information on external factors outside a vehicle, such as a road sign and route guidance, onto the upper portion of an image forming plane, and projects objects related to information on the own vehicle, such as the vehicle speed and ON/OFF of cruise control, onto the lower portion of the image forming plane.
[Patent Literature 1] Japanese Patent No. 6354633

SUMMARY

Problems to be Solved

However, the image forming plane onto which the head-up display device projects objects related to various types of information should have a shape with a short length in the up-down direction so as not to obstruct the line of vision of the driver looking ahead of the vehicle. Therefore, with the head-up display device, it would be difficult to arrange a plurality of objects, such as sign guidance and route guidance, in the up-down direction of the image forming plane sequentially along the travel route of the vehicle, unlike with a navigation device. Accordingly, with the conventional head-up display device, it has been difficult to allow a driver to intuitively recognize the nearest information and the following information sequentially along the travel route of the vehicle.

Solutions for Solving the Problems

The present disclosure has been made to solve the foregoing problems, and it is an object of the present disclosure to provide a head-up display device that allows a driver to intuitively recognize a plurality of objects sequentially along a travel route of a vehicle while projecting a video onto an image forming plane that has a length in the vertical direction shorter than a length in the horizontal direction.

A head-up display device according to one or more aspects of the present disclosure is a device for projecting driving-related information onto an image forming plane provided ahead of a driver seat, including a controller and an optical processor. The controller receives the driving-related information, and generates an image signal from the received driving-related information. The optical processor obtains the image signal from the controller, and outputs a light beam to the image forming plane.

The controller includes a first information receiving unit, a second information receiving unit, and an image signal generation unit. The first information receiving unit receives first information that is the current or nearest driving-related information along a travel route of a vehicle. The second information receiving unit receives second information that is the driving-related information following the first information. The image signal generation unit generates a first image signal based on the first information and generates a second image signal based on the second information.

The optical processor outputs a light beam to the image forming plane as seen in plan view from the driver seat so as to display a left line segment object, a right line segment object, a first information object, and a second information object. The left line segment object is an object extending diagonally from a central portion in a left-right direction to a left side in a direction from an upper portion to a lower portion. The right line segment object is an object disposed on a right side of the left line segment object and extending diagonally from the central portion to a right side in the direction from the upper portion to the lower portion. The first information object is an object generated from the first image signal and disposed at a position along one of the left line segment object and the right line segment object on an outer side of the one of the line segment objects in the left-right direction. The second information object is an object generated from the second image signal and disposed at a position along the one of the line segment objects on the outer side of the one of the line segment objects in the left-right direction, and diagonally above the first information object.

With the head-up display device according to the aforementioned aspect, the left line segment object and the right line segment object are displayed on the image forming plane, and the left line segment object and the right line segment object are displayed such that the gap between them gradually expands in the direction from the upper portion to the lower portion. Thus, such line segment objects can remind the driver of a driving lane on the image forming plane with a sense of perspective.

In addition, with the head-up display device according to the aforementioned aspect, the first information object related to the first information that appears first along the travel route, and the second information object related to the second information that appears next along the travel route are both disposed along one of the aforementioned line segment objects, and the first information object is displayed below the second information object.

Therefore, with the head-up display device according to the aforementioned aspect, it is possible to allow the driver to intuitively recognize that the first information represented by the first information object is the preceding information, and the second information represented by the second information object is the following information, together with the left line segment object and right line segment object that remind the driver of the driving lane.

Thus, with the head-up display device according to the aforementioned aspect, it is possible to allow the driver to intuitively recognize a plurality of information objects (i.e., the first information object and the second information object) sequentially along the travel route of the vehicle while projecting a video onto the image forming plane that has a length in the vertical direction shorter than a length in the horizontal direction.

In the head-up display device according to the aforementioned aspect, the image signal generation unit may generate the first image signal and the second image signal so that the first information object is displayed in a form with higher visibility for a driver of the vehicle than the second information object on the image forming plane.

With the head-up display device according to the aforementioned aspect, since the first information object is displayed in a form with higher visibility than the second information object on the image forming plane, it is possible to direct the driver's attention more to the first information object with relatively higher visibility.

In the head-up display device according to the aforementioned aspect, the image signal generation unit may generate the first image signal and the second image signal so that the first information object is displayed with a larger size than the second information object on the image forming plane.

With the head-up display device according to the aforementioned aspect, since the first information object is displayed with a larger size than the second information object on the image forming plane, it is possible to direct the driver's attention more to the first information object with a larger size. In addition, as the first information object has a larger size than the second information object, it is possible to allow the driver to feel a sense of perspective even more.

In the head-up display device according to the aforementioned aspect, each of the first information object and the second information object may include at least one of a line segment of a straight line and a line segment of a curved line, and the image signal generation unit may generate the first image signal and the second image signal so that the line segment of the first information object is displayed with a thicker line width than the line segment of the second information object on the image forming plane.

With the head-up display device according to the aforementioned aspect, since the first information object includes line segments with thicker line widths than the second information object on the image forming plane, it is possible to direct the driver's attention more to the first information including line segments with thicker line widths.

In the head-up display device according to the aforementioned aspect, the controller may further include a third information receiving unit that receives third information that is the current or nearest driving-related information along the travel route of the vehicle and is the driving-related information of a type different from the first information, and a fourth information receiving unit that receives fourth information that is the driving-related information following the third information, the image signal generation unit may generate a third image signal based on the third information and also generate a fourth image signal based on the fourth information, and the optical processor may output a light beam to the image forming plane as seen in plan view from the driver seat so as to display the following: a third information object that is an object generated from the third image signal and disposed at a position along the other line segment object different from the one of the left line segment object and the right line segment object on an outer side of the other line segment object in the left-right direction, and a fourth information object that is an object generated from the fourth image signal and disposed at a position along the other line segment object on the outer side of the other line segment object in the left-right direction, and diagonally above the third information object.

With the head-up display device according to the aforementioned aspect, the third information object and the fourth information object are also displayed on the image forming plane in addition to the first information object and the second information object. Thus, it is possible to allow the driver to recognize more pieces of information via the image forming plane.

With the head-up display device according to the aforementioned aspect, the third information object related to the third information that appears first along the travel route and the fourth object related to the fourth information that appears next along the travel route are both disposed along the other line segment object, and the third information object is displayed below the fourth information object.

Therefore, with the head-up display device according to the aforementioned aspect, it is possible to allow the driver to intuitively recognize that the third information represented by the third information object is the preceding information, and the fourth information represented by the fourth information object is the following information, as with the relationship between the first information object and the second information object.

In the head-up display device according to the aforementioned aspect, the first information and the second information may be the driving-related information of the same type, and the third information and the fourth information may be the driving-related information of the same type.

With the head-up display device according to the aforementioned aspect, since the first information and the second information are the information of the same type, it is possible to allow the driver to, upon looking at the first information object and the second information object, intuitively recognize the transition between the pieces of information of the same type along the travel route. Likewise, since the third information and the fourth information are the information of the same type, it is possible to allow the driver to, upon looking at the third information object and the fourth information object, intuitively recognize the transition between the pieces of information of the same type along the travel route.

With the head-up display device according to the aforementioned aspect, the first information and the second information may be road sign information, the third information and the fourth information may be route guidance information, and when the vehicle is a right-hand drive vehicle, the one of the line segment objects may be the right line segment object, and the other line segment object may be the left line segment object, while when the vehicle is a left-hand drive vehicle, the one of the line segment objects may be the left line segment object, and the other line segment object may be the right line segment object.

With the head-up display device according to the aforementioned aspect, when the vehicle is a right-hand drive vehicle, the first information object and the second information object each representing the road sign information are displayed around the right part of the image forming plane. Thus, it is possible to allow the driver to intuitively recognize the road sign information by displaying the first information object and the second information object on the image forming plane at corresponding positions along the direction in which the actual road signs are provided. Meanwhile, when the vehicle is a left-hand drive vehicle, the first information object and the second information object each representing the road sign information are displayed around the left part of the image forming plane. Thus, it is also possible to allow the driver to intuitively recognize the road sign information by displaying the first information object and the second information object on the image forming plane at corresponding positions along the direction in which the actual road signs are provided.

In the head-up display device according to the aforementioned aspect, the controller may further include a fifth information receiving unit that receives fifth information about presence or absence of a preceding vehicle as well as, if the preceding vehicle is present, an inter-vehicle distance from the preceding vehicle, the image signal generation unit may also generate a fifth image signal based on the fifth information, and the optical processor may output a light beam to the image forming plane as seen in plan view from the driver seat so that a fifth information object is also displayed, the fifth information object being an object generated from the fifth image signal and disposed at a position between the left line segment object and the right line segment object.

With the head-up display device according to the aforementioned aspect, the fifth information object representing information about a preceding vehicle is also displayed. Thus, it is possible to allow the driver to, upon looking at the image forming plane, also recognize the information about the preceding vehicle. In addition, with the head-up display device according to the aforementioned aspect, the fifth information object is displayed at a position between the left line segment object and the right line segment object. Thus, it is possible to allow the driver to intuitively recognize the information about the preceding vehicle in the driving lane where the driver's own vehicle is traveling.

With the head-up display device according to each of the aforementioned aspects, it is possible to allow a driver to intuitively recognize a plurality of objects sequentially along a travel route of a vehicle while projecting a video onto an image forming plane that has a length in the vertical direction shorter than a length in the horizontal direction.

DETAILED DESCRIPTION

Hereinafter, an embodiment of the present disclosure will be described with reference to the drawings. It should be noted that the embodiment described below is only an example of the present disclosure, and the present disclosure is not limited thereto except its inherent configuration.

1. Configuration of Interior of Vehicle Cabin 100a of Vehicle 100

Figure 1:
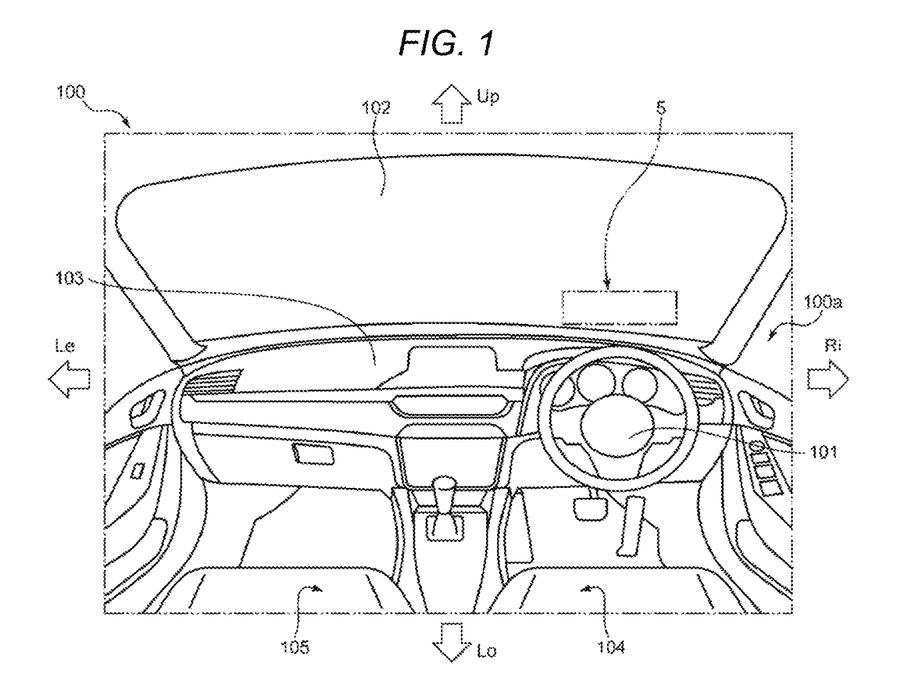
FIG. 1 is a view illustrating the configuration of the interior of a vehicle cabin of a vehicle to which a head-up display device according to one or more aspects of the present disclosure is applied.
Figure 2:
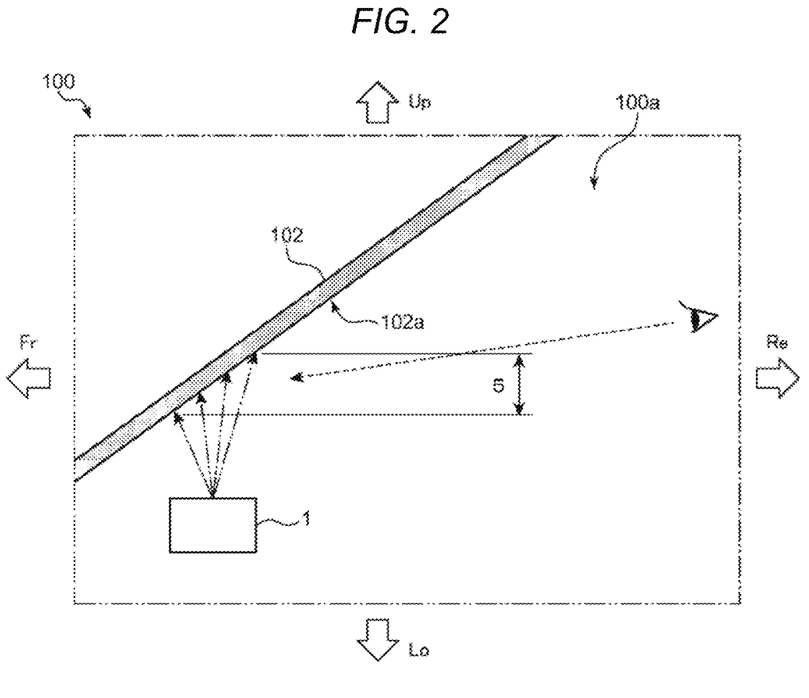
FIG. 2 is a schematic view illustrating a head-up display device and an image forming plane.

Described below with reference to FIGS. 1 and 2 is the configuration of the interior of a vehicle cabin 100a of a vehicle 100 to which a head-up display device according to one or more aspects of the disclosed subject matter is applied.

As illustrated in FIG. 1, the vehicle 100 is a right-hand drive vehicle in which a steering wheel 101 is provided on the right side in the vehicle width direction. A dashboard 103 is provided ahead of the steering wheel 101, and a front windshield 102 is provided in a state upwardly extending from the front end portion of the dashboard 103.

A driver seat 104 is provided behind the steering wheel 101, and a passenger seat 105 is provided on the left side of the driver seat 104.

As illustrated in FIG. 1, the front windshield 102 is a portion ahead of the driver seat 104, and an image forming plane 5 is disposed around the lower portion of the front windshield 102 in the up-down direction. As illustrated in FIG. 2, the image forming plane 5 is provided on the side of the interior surface 102a of the front windshield 102. A head-up display device (hereinafter described as a "HUD device") 1 provided in the dashboard 103 outputs a light beam to the image forming plane 5. Then, an image representing driving-related information is displayed on the image forming plane 5 so that the driver can obtain the driving-related information by looking at the image displayed on the image forming plane 5.

2. Configuration of HUD Device 1

The configuration of the HUD device 1 according to the present disclosure will be described with reference to FIGS. 3 and 4.

Figure 3:
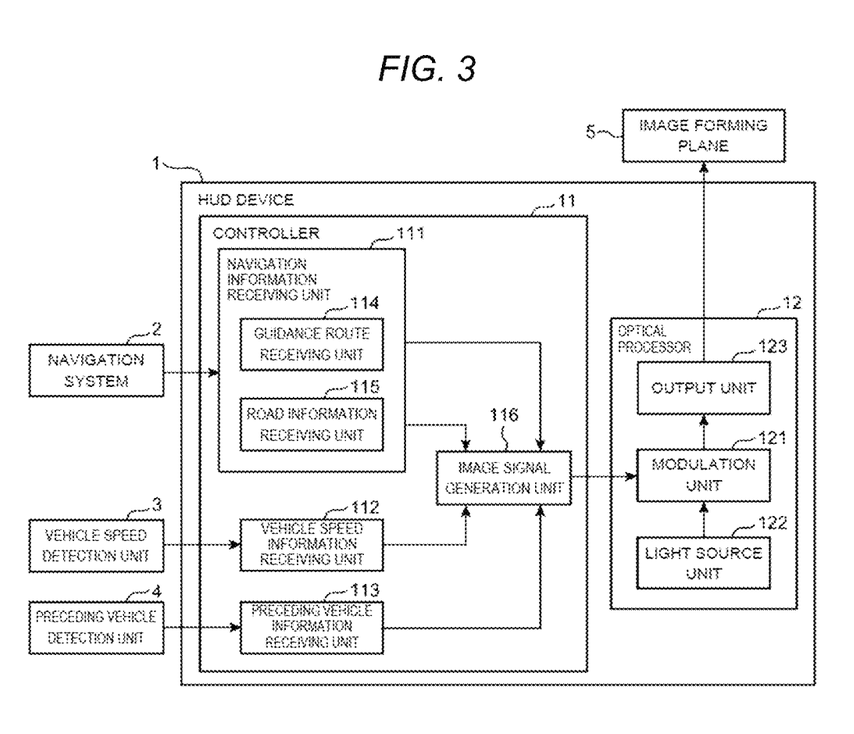
FIG. 3 is a block diagram illustrating the configuration of the head-up display device.

As illustrated in FIG. 3, the HUD device 1 includes a controller 11 and an optical processor 12. The controller 11 includes a microprocessor and a memory, such as a MPU/CPU, ASIC, ROM, and RAM. The controller 11 executes firmware stored in the memory in advance, for example, to generate an image signal related to driving-related information, and outputs the signal to the optical processor 12.

The controller 11 includes a navigation information receiving unit 111, a vehicle speed information receiving unit 112, a preceding vehicle information receiving unit 113, and an image signal generation unit 116. The navigation information receiving unit 111 receives from a navigation system 2 an input of information about a guidance route and road information. The navigation information receiving unit 111 includes a guidance route receiving unit 114 that receives information about a guidance route from the navigation system 2, and a road information receiving unit 115 that receives road information from the navigation system 2.

Figure 4:
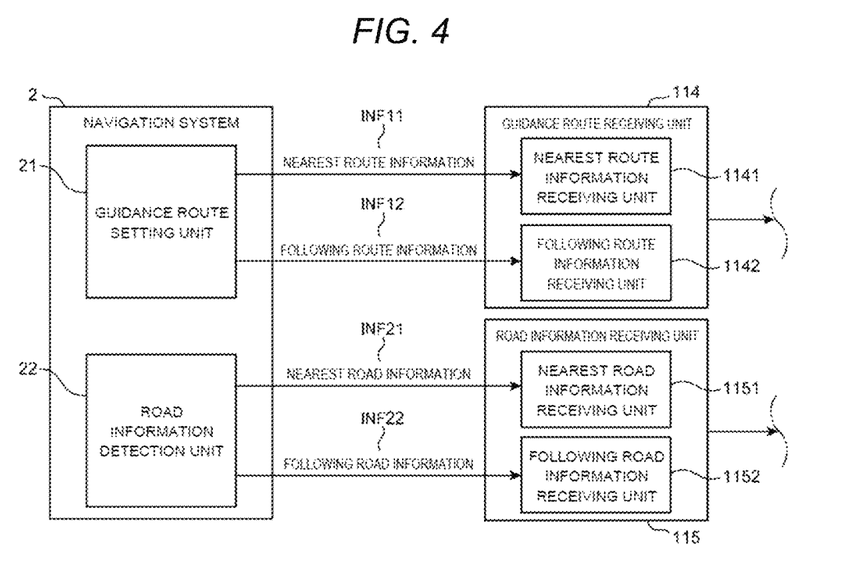
FIG. 4 is a block diagram illustrating the detailed configuration of a guidance route receiving unit and a road information receiving unit.

As illustrated in FIG. 4, the navigation system 2 includes a guidance route setting unit 21 and a road information detection unit 22. The guidance route setting unit 21 is a section that sets a guidance route for guiding the vehicle 100 to an input destination, and outputs nearest route information INF11 and following route information INF12 to the guidance route receiving unit 114. The guidance route receiving unit 114 includes a nearest route information receiving unit 1141 that receives the nearest route information INF11 and a following route information receiving unit 1142 that receives the following route information INF12.

Herein, the nearest route information INF11 is information (i.e., route guidance information) about the current or nearest guidance route along the travel route of the vehicle 100, and corresponds to "third information." The following route information INF12 is information (i.e., route guidance information) about a guidance route following the nearest route information INF11 along the travel route of the vehicle 100, and corresponds to "fourth information."

As illustrated in FIG. 4, the road information detection unit 22 is a section that detects information (i.e., route guidance information) about a road sign that is present on the route to be travelled by the vehicle 100, and outputs nearest road information INF21 and following road information INF22. The road information receiving unit 115 includes a nearest road information receiving unit 1151 that receives the nearest road information INF21 and a following road information receiving unit 1152 that receives the following road information INF22.

The nearest road information INF21 is information about the current or nearest road sign that is present along the travel route of the vehicle 100, and corresponds to "first information." The following road information INF22 is information about a road sign following the nearest road information INF21 along the travel route of the vehicle 100, and corresponds to "second information."

Referring back to FIG. 3, the vehicle speed information receiving unit 112 receives an input of information about the vehicle speed of the vehicle 100 from a vehicle speed detection unit 3 provided in the vehicle 100. It should be noted that there may be a case where the information about the vehicle speed from the vehicle speed detection unit 3 is input to the vehicle speed information receiving unit 112 via an ECU (Electronic Control Unit) of the vehicle 100.

The preceding vehicle information receiving unit 113 receives from a preceding vehicle detection unit 4, which includes a device (for example, a radar, laser, or camera) provided in the vehicle 100 for detecting a preceding vehicle, information about the presence or absence of a preceding vehicle as well as, if the preceding vehicle is present, information about the inter-vehicle distance between the own vehicle 100 and the preceding vehicle.

It should be noted that the aforementioned information output from the preceding vehicle detection unit 4 corresponds to "fifth information."

The image signal generation unit 116 generates image signals based on the information received by the guidance route receiving unit 114, the road information receiving unit 115, the vehicle speed information receiving unit 112, and the preceding vehicle information receiving unit 113. Specifically, the image signal generation unit 116 generates a nearest route guidance image signal (i.e., a third image signal) based on the nearest route information INF11, and generates a following route guidance image signal (i.e., a fourth image signal) based on the following route information INF12. In addition, the image signal generation unit 116 generates a nearest road sign image signal (i.e., a first image signal) based on the nearest road information INF21, and generates a following road sign image signal (i.e., a second image signal) based on the following road information INF22. Further, the image signal generation unit 116 generates a vehicle speed image signal based on the vehicle speed information, and generates a preceding vehicle image signal (i.e., a fifth image signal) based on the preceding vehicle information.

The optical processor 12 includes a modulation unit 121, a light source unit 122, and an output unit 123. The modulation unit 121 modulates a light beam output from the light source unit 122 according to each image signal sent from the image signal generation unit 116, thereby generating a video beam.

The light source unit 122 includes LEDs (Light Emitting Diodes) or semiconductor laser devices, and outputs a light beam to the modulation unit 121. The output unit 123 outputs to the image forming plane 5 the video item generated through modulation by the modulation unit 121. It should be noted that the video beam output from the output unit 123 defines a display area on the image forming plane 5 for each image signal input to the optical processor 12.

3. Arrangement Pattern of Display Areas of Various Objects on Image Forming Plane 5

Figure 5:
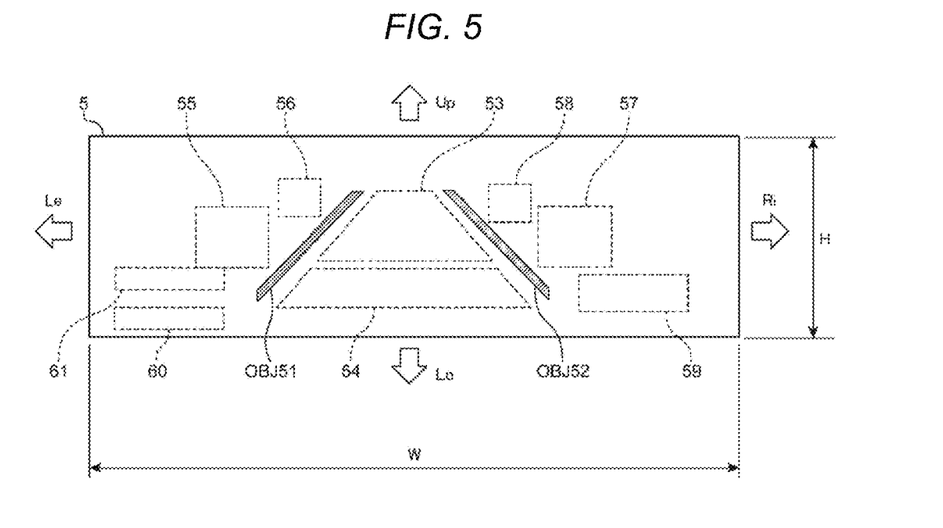
FIG. 5 is a schematic view illustrating the arrangement pattern of display areas of various objects on the image forming plane.

An arrangement pattern of display areas of various objects on the image forming plane 5 will be described with reference to FIG. 5. FIG. 5 is a schematic plan view of the image forming plane 5 as seen from the side of the driver.

As illustrated in FIG. 5, the image forming plane 5 has a horizontally long rectangular shape with a horizontal width W longer than a height H. When a video beam is output to the image forming plane 5 from the optical processor 12, two strips of line segment objects OBJ51 and OBJ52 are displayed approximately in the central portion of the image forming plane 5 in the horizontal direction (i.e., vehicle width direction). The two strips of line segment objects OBJ51 and OBJ52 are always displayed on the image forming plane 5 while the HUD device 1 is driven.

The line segment object OBJ51 is a line segment object disposed on the left side of the line segment object OBJ52 and extending diagonally from the central portion in the vehicle width direction (i.e., left-right direction) to the left side in the direction from the upper portion to the lower portion. Hereinafter, the line segment object OBJ51 shall be described as a "left line segment object OBJ51."

The line segment object OBJ52 is a line segment object disposed on the right side of the left line segment object OBJ51 with a gap therebetween, and extending diagonally from the central portion in the vehicle width direction (i.e., left-right direction) to the right side in the direction from the upper portion to the lower portion. Hereinafter, the line segment object OBJ52 shall be referred to as a "right line segment object OBJ52."

The left line segment object OBJ51 and the right line segment object OBJ52 are displayed such that the gap between them in the left-right direction gradually expands in the direction from the upper portion to the lower portion.

An intermediate upper display area 53 is set in the upper portion of an area between the left line segment object OBJ51 and the right line segment object OBJ52, and an intermediate lower display area 54 is displayed in the lower portion thereof. In the intermediate upper display area 53, a preceding vehicle object generated from a preceding vehicle image signal is displayed when a preceding vehicle has been detected with the preceding vehicle detection unit 4. In the intermediate lower display area 54, an object related to the cruise control setting information is displayed.

On the left side of the left line segment object OBJ51, a left-side central display area 55 and a left-side upper display area 56 are set along the left line segment object OBJ51. The left-side central display area 55 is set below the left-side upper display area 56. In the left-side central display area 55, a nearest route information object generated from a nearest route guidance image signal based on the nearest route information INF11 is displayed. In the left-side upper display area 56, a following route information object generated from a following route image signal based on the following route information INF12 is displayed.

Herein, the size of the left-side central display area 55 is set larger than the size of the left-side upper display area 56.

On the right side of the right line segment object OBJ52, a right-side central display area 57 and a right-side upper display area 58 are set along the right line segment object OBJ52. The right-side central display area 57 is set below the right-side upper display area 58. In the right-side central display area 57, a nearest road sign information object generated from a nearest road sign image signal based on the nearest road information INF21 is displayed. In the right-side upper display area 58, a following road sign information object generated from a following road sign image signal based on the following road information INF22 is displayed.

Herein, the size of the right-side central display area 57 is set larger than the size of the right-side upper display area 58.

A right-side lower display area 59 is set below the right-side central display area 57. In the right-side lower display area 59, a vehicle speed information object generated from a vehicle speed image signal based on the vehicle speed information from the vehicle speed detection unit 3 is displayed. The driver can check the speed of his/her own vehicle 100 by looking at the right-side lower display area 59.

A left-side first lower display area 60 and a left-side second lower display area 61 are set below the left-side central display area 55. The left-side first lower display area 60 is set below the left-side second lower display area 61. In the left-side first lower display area 60, an object related to the estimated arrival time of the vehicle 100 at the destination, which has been generated from an image signal based on the information from the navigation system 2 and the vehicle speed detection unit 3, is displayed. In the left-side second lower display area 61, an information object related to the moving direction at an intersection related to the nearest route information INF11 is displayed.

4. Display Examples of Various Objects OBJ51 to OBJ61 on Image Forming Plane 5

Figure 6:
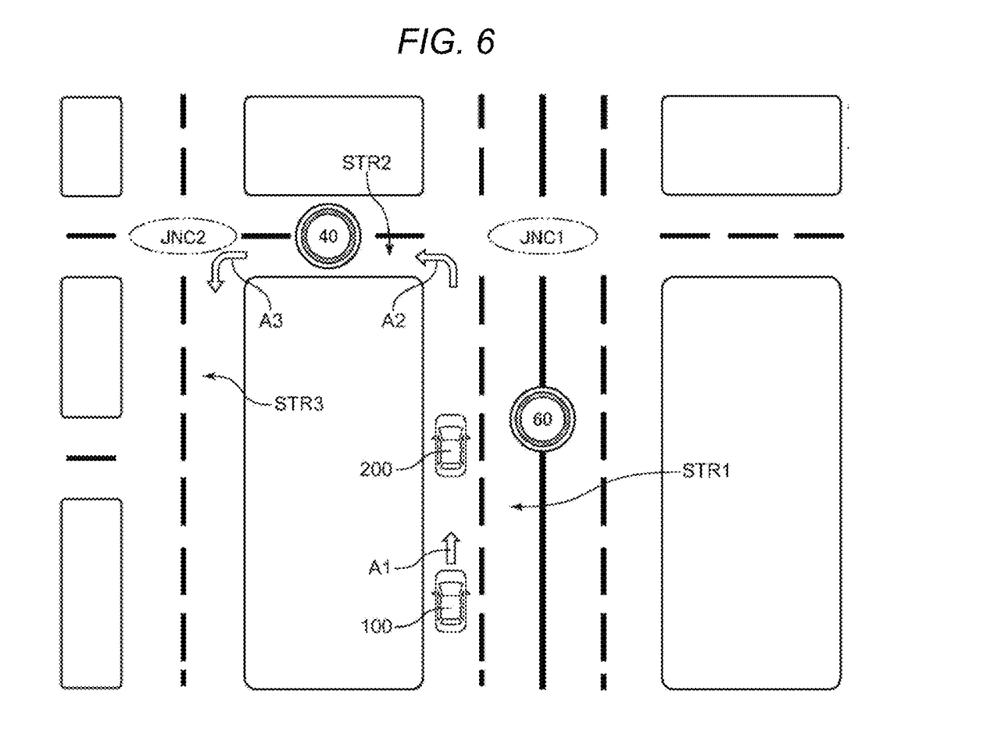
FIG. 6 is a schematic view illustrating the travel route of the vehicle.
Figure 7:
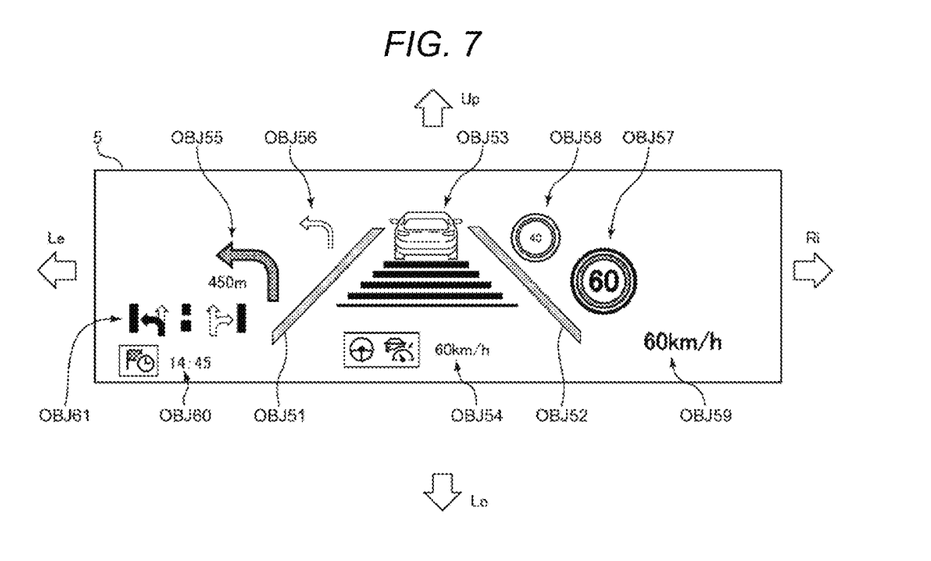
FIG. 7 is a schematic view illustrating various objects displayed on the image forming plane.

Display examples of various objects OBJ51 to OBJ61 on the image forming plane 5 will be described with reference to FIGS. 6 and 7. FIG. 6 is a schematic view illustrating the travel route and the surrounding circumstance of the vehicle 100, and FIG. 7 is a schematic view illustrating the various objects OBJ51 to OBJ61 displayed on the image forming plane 5 at the current places illustrated in FIG. 6.

As illustrated in FIG. 6, the vehicle 100 is travelling straight along a road STR1 with two lanes on each side (indicated by the arrow A1). In addition, a preceding vehicle 200 is travelling ahead of the own vehicle 100 in the same direction as the own vehicle 100. A road sign, which indicates that the speed limit on the road STR1 is 60 km/h, is built on the side of the road STR1. In the vehicle 100, the HUD device 1 receives from the navigation system 2 information to the effect that the speed limit on the road STR1 is 60 km/h. In addition, the HUD device 1 also receives from the preceding vehicle detection unit 4 provided in the vehicle 100 information to the effect that the preceding vehicle 200 is present and information about the inter-vehicle distance between the own vehicle 100 and the preceding vehicle 200. Further, the HUD device 1 also receives from the vehicle speed detection unit 3 information about the vehicle speed of the own vehicle 100.

The vehicle 100 is to turn left at an intersection JNC1 that is about 450 m ahead so as to enter a road STR2 (indicated by the arrow A2), and to turn left at an intersection JNC2 on the road STR2 so as to enter a road STR3 (indicated by the arrow A3). The navigation system 2 sends information about such route guidance to the HUD device 1.

It should be noted that the navigation system 2 sends to the HUD device 1 information to the effect that the speed limit on the road STR2 is 40 km/h.

In the example illustrated in FIG. 6, the information to the effect that the vehicle 100 is to turn left as indicated by the arrow A2 corresponds to the "nearest route information INF11," and the information to the effect that the vehicle 100 is to turn left as indicated by the arrow A3 corresponds to the "following route information INF12." in addition, the information to the effect that the speed limit on the road STR1 is 60 km/h corresponds to the "nearest road information INF21," and the information to the effect that the speed limit on the road STR2 is 40 km/h corresponds to the "following road information INF22." Further, the information to the effect that the preceding vehicle 200 is present as detected by the preceding vehicle detection unit 4 and the information about the inter-vehicle distance between the own vehicle 100 and the preceding vehicle 200 corresponds to the "preceding vehicle information."

In such a circumstance, various objects OBJ51 to OBJ61 such as those illustrated in FIG. 7 are displayed on the image forming plane 5 of the vehicle 100 that is traveling straight along the road STR1 as indicated by the arrow A1. Specifically, the left line segment object OBJ51 and the right line segment object OBJ52 are displayed in the central portion of the image forming plane 5 in the left-right direction as described above. Such line segment objects OBJ51 and OBJ52 remind the driver of demarcation lines on the opposite sides of the driving lane.

A preceding vehicle information object OBJ53 is displayed in the intermediate upper display area 53 between the left line segment object OBJ51 and the right line segment object OBJ52. The preceding vehicle information object OBJ53 is an object indicating information to the effect that the preceding vehicle 200 is present and information about the inter-vehicle distance between the own vehicle 100 and the preceding vehicle 200, and corresponds to a "fifth information object."

A set vehicle speed information object OBJ54 is displayed in the intermediate lower display area 54 below the intermediate upper display area 53 in which the preceding vehicle information object OBJ53 is displayed. The set vehicle speed information object OBJ54 is an object indicating various setting conditions of cruise control, such as the set speed.

A route guidance information object OBJ55 is displayed in the left-side central display area 55 on the left side of the left line segment object OBJ51. The route guidance information object OBJ55 is an object generated from an image signal based on the nearest route information INF11, and corresponds to a "third information object."

A route guidance information object OBJ56 is displayed in the left-side upper display area 56 on the left side of the left line segment object OBJ51 and above the left-side central display area 55. The route guidance information object OBJ56 is an object generated from an image signal based on the following route information INF12, and corresponds to a "fourth information object."

It should be noted that the size of the route guidance information object OBJ55 in the height direction and the left-right direction is set larger than that of the route guidance information object OBJ56. In addition, each of the route guidance information object OBJ55 and the route guidance information object OBJ56 includes straight lines and curved lines, but the line widths of the line segments included in the route guidance information object OBJ55 are thicker than those of the route guidance information object OBJ56.

A road sign information object OBJ57 is displayed in the right-side central display area 57 on the right side of the right line segment object OBJ52. The road sign information object OBJ57 is an object generated from an image signal based on the nearest road information INF21, and corresponds to a "first information object."

A road sign information object OBJ58 is displayed in the right-side upper display area 58 on the right side of the right line segment object OBJ52 and above the right-side central display area 57. The road sign information object OBJ58 is an object generated from an image signal based on the following road information INF22, and corresponds to a "second information object."

It should be noted that the size of the road sign information object OBJ57 in the height direction and the left-right direction is set larger than that of the road sign information object OBJ58. In addition, each of the road sign information object OBJ57 and the road sign information object OBJ58 includes curved lines, but the line widths of the line segments included in the road sign information object OBJ57 are thicker than those of the road sign information object OBJ58.

A vehicle speed information object OBJ59 is displayed in the right-side lower display area 59 below the right-side central display area 57. The vehicle speed information object OBJ59 is an object generated from an image signal based on the vehicle speed information from the vehicle speed detection unit 3. The size of the vehicle speed information object OBJ59 in the height direction and the left-right direction is set larger than that of the set vehicle speed information object OBJ54, and the vehicle speed information object OBJ59 includes line segments thicker than those of the set vehicle speed information object OBJ54 so that the driver can easily see the vehicle speed information object OBJ59.

An estimated arrival time information object OBJ60 is displayed in the left-side first lower display area 60 below the left-side central display area 55. The estimated arrival time information object OBJ60 is an object indicating the estimated arrival time of the vehicle 100 at the destination based on the information from the navigation system 2 and the vehicle speed detection unit 3.

A lane information object OBJ61 is displayed in the left-side second lower display area 61 between the left-side central display area 55 and the left-side first lower display area 60. The lane information object OBJ61 is an object indicating information about the moving direction at the nearest intersection JNC1 where the vehicle 100 is to turn left first.

5. Effects

With the HUD device 1 according to the present disclosure, the left line segment object OBJ51 and the right line segment object OBJ52 are displayed on the image forming plane 5. The left line segment object OBJ51 and the right line segment object OBJ52 are displayed such that the gap between them gradually expands in the direction from the upper portion to the lower portion. Thus, the line segment objects OBJ51 and OBJ52 can remind the driver of a driving lane on the image forming plane 5 with a sense of perspective.

In addition, with the HUD device 1, the road sign information object OBJ57 that appears first along the travel route and the road sign information object OBJ58 that appears next along the travel route are both disposed along the right line segment object OBJ52, and the road sign information object OBJ57 is displayed below the road sign information object OBJ58. Therefore, with the HUD device 1, it is possible to allow the driver to intuitively recognize that the road information represented by the road sign information object OBJ57 is the preceding information, and the road information represented by the road sign information object OBJ58 is the following information, together with the left line segment object OBJ51 and the right line segment object OBJ52 that remind the driver of the driving lane.

Thus, with the HUD device 1, it is possible to allow the driver to intuitively recognize the two information objects (i.e., the road sign information object OBJ57 and the road sign information object OBJ58) sequentially along the travel route of the vehicle 100 while projecting a video onto the image forming plane 5 that has a length in the vertical direction shorter than a length in the horizontal direction.

Alternatively, or additionally, with the HUD device 1, the road sign information object OBJ57 is displayed in a form with higher visibility than the road sign information object OBJ58 on the image forming plane 5. Thus, it is possible to direct the driver's attention more to the road sign information object OBJ57 with relatively higher visibility.

Specifically, with the HUD device 1, the road sign information object OBJ57 is displayed with a larger size in the height direction and the horizontal direction than the road sign information object OBJ58 on the image forming plane 5. Thus, it is possible to direct the driver's attention more to the road sign information object OBJ57 with a larger size. In addition, as the road sign information object OBJ57 has a larger size than the road sign information object OBJ58, it is possible to allow the driver to feel a sense of perspective even more.

In addition, with the HUD device 1, the road sign information object OBJ57 includes line segments with thicker line widths than the road sign information object OBJ58 on the image forming plane 5. Thus, it is possible to direct the driver's attention more to the road sign information object OBJ57 including line segments with thicker line widths.

In addition, with the HUD device 1, the route guidance information object OBJ55 and the route guidance information object OBJ56 are also displayed on the image forming plane 5. Thus, it is possible to allow the driver to recognize more pieces of information via the image forming plane 5.

In addition, with the HUD device 1, the route guidance information object OBJ55 related to the route guidance information that appears first along the travel route and the route guidance information object OBJ56 related to the route guidance information that appears next along the travel route are both disposed along the left line segment object OBJ51, and the route guidance information object OBJ55 is displayed below the route guidance information object OBJ56. Therefore, with the HUD device 1, it is possible to allow the driver to intuitively recognize that the route guidance information represented by the route guidance information object OBJ55 is the preceding information, and the route guidance information represented by the route guidance information object OBJ56 is the following information.

In addition, with the HUD device 1, the information represented by the road sign information object OBJ57 and the information represented by the road sign information object OBJ58 are information related to road signs of the same type. Thus, it is possible to allow the driver to, upon looking at the road sign information object OBJ57 and the road sign information object OBJ58, intuitively recognize the transition between the pieces of road sign information of the same type along the travel route. Likewise, since the information represented by the route guidance information object OBJ55 and the information represented by the route guidance information object OBJ56 are information related to route guidance of the same type, it is possible to allow the driver to, upon looking at the route guidance information object OBJ55 and the route guidance information object OBJ56, intuitively recognize the transition between the pieces of route guidance information of the same type along the travel route.

In addition, with the HUD device 1 according to one or more aspects of the present disclosure, the vehicle 100 is a right-hand drive vehicle, and the road sign information object OBJ57 and the road sign information object OBJ58 are displayed around the right part of the image forming plane 5. Thus, it is possible to allow the driver to intuitively recognize the road sign information by displaying the road sign information object OBJ57 and the road sign information object OBJ58 on the image forming plane 5 at corresponding positions along the direction in which the actual road signs are provided.

It should be noted that when the vehicle is a left-hand drive vehicle, the road sign information object OBJ57 and the road sign information object OBJ58 may be displayed around the left part of the image forming plane 5. Then, it is possible to allow the driver to intuitively recognize the road sign information by displaying the road sign information object OBJ57 and the road sign information object OBJ58 on the image forming plane 5 at corresponding positions along the direction in which the actual road signs are provided.

In addition, with the HUD device 1, the preceding vehicle information object OBJ53 representing information about the preceding vehicle 200 is also displayed. Thus, it is possible to allow the driver to, upon looking at the image forming plane 5, also recognize the information about the preceding vehicle 200. In addition, with the HUD device 1, the preceding vehicle information object OBJ53 is displayed at a position between the left line segment object OBJ51 and the right line segment object OBJ52. Thus, it is possible to allow the driver to intuitively recognize information on the preceding vehicle 200 in the driving lane where the driver's own vehicle 100 is traveling.

As described above, with the HUD device 1, it is possible to allow the driver to intuitively recognize the plurality of objects OBJ55 to OBJ58 sequentially along the travel route of the vehicle 100 while projecting a video onto the image forming plane 5 that has a length in the vertical direction shorter than a length in the horizontal direction.

Modified Example

In one or more aspects of the disclosed subject matter, the two road sign information objects OBJ57 and OBJ58 and the two route guidance information objects OBJ55 and OBJ56 are displayed on the image forming plane 5, but the present disclosure is not limited thereto. For example, it is also possible to display only two objects including an object related to the nearest road sign information and an object related to the following road sign information on the image forming plane, or conversely, display only two objects including an object related to the nearest route guidance information and an object related to the following route guidance information on the image forming plane. It should be noted that in each of such cases, it is required that the left line segment object and the right line segment object be displayed and the aforementioned objects be arranged in the same pattern as that of the aforementioned embodiment so that the driver can recognize the information with a sense of perspective.

In one or more aspects of the disclosed subject matter, the objects OBJ55 and OBJ56 displayed on the left side of the left line segment object OBJ51 are objects related to information of the same type, and the objects OBJ57 and OBJ58 displayed on the right side of the right line segment object OBJ52 are objects related to information of the same type, but the present disclosure is not limited thereto. For example, it is also possible to display an object related to the nearest driving-related information on the outer side of one of the left and right line segment objects in the horizontal direction, and display an object related to the following driving-related information (i.e., information of a type different from the nearest driving-related information) diagonally above such object.

In one or more aspects of the disclosed subject matter, the preceding vehicle information object OBJ53 is displayed between the left line segment object OBJ51 and the right line segment object OBJ52, but in the present disclosure, the display of the preceding vehicle information object is not essential. Likewise, the display of the objects OBJ59, OBJ60, and OBJ61 is not essential, either.

In one or more aspects of the disclosed subject matter, a front windshield projection type in which the image forming plane 5 is provided on the front windshield 102 is adopted as an example, but in the present disclosure, a combiner type may also be adopted. That is, it is also possible to adopt a type in which a projection plane onto which a video is projected is provided between the front windshield and the driver.

In one or more aspects of the disclosed subject matter, the nearest information and the following information are obtained for each of the road sign information and the route guidance information so that the objects OBJ55 to OBJ58 are displayed on the image forming plane 5. However, in the present disclosure, the types of the nearest driving-related information and the following driving-related information are not limited thereto. For example, it is also possible to obtain the nearest information and the following information for the information about whether a hands-free drive is possible or not, and display them by arranging them in the up-down direction along the line segment objects.

In one or more aspects of the disclosed subject matter, the road sign information object OBJ57 and the road sign information object OBJ58 are displayed so as not to overlap each other, and likewise, the route guidance information object OBJ55 and the route guidance information object OBJ56 are displayed so as not to overlap each other. However, the present disclosure is not limited thereto, and the nearest information object and the following information object may be displayed so as to partially overlap each other. In such a case, however, it is desirable to display the nearest information object on top of the following information object.

The foregoing does not describe that the color of the information object representing the nearest driving-related information is set different from the color of the information object representing the following driving-related information. However, in the present disclosure, the color of the information object representing the nearest driving-related information may be set different from the color of the information object representing the following driving-related information. For example, the object related to the nearest driving-related information may be displayed in color, while the object related to the following driving-related information may be displayed in monochrome.

In one or more aspects of the disclosed subject matter, each of the left line segment object OBJ51 and the right line segment object OBJ52 is represented by a straight line. However, in the present disclosure, each of such line segment objects may be represented by a curved line. In such a case, it is desirable to dispose the center of the curvature of the left line segment object on the left side of the left line segment object and dispose the center of the curvature of the right line segment object on the right side of the right line segment object so as to allow the driver to feel a sense of perspective.

What is claimed is:

1. A head-up display device for projecting driving-related information onto an image forming plane provided ahead of a driver seat, comprising:
   a controller configured to receive the driving-related information, and generate an image signal from the received driving-related information; and
   an optical processor configured to obtain the image signal from the controller, and output a light beam to the image forming plane, wherein
   the controller is further configured to
   receive first information that is the current or nearest driving-related information along a travel route of a vehicle,
   receive second information that is the driving-related information following the first information,
   receive third information that is the current or nearest driving-related information along the travel route of the vehicle and is the driving-related information of a type different from the first information,
   receive fourth information that is the driving-related information following the third information,
   receive sixth information that is lane information corresponding to a lane that the vehicle uses to turn at an intersection, and
   generate a first image signal based on the first information, generate a second image signal based on the second information, generate a third image signal based on the third information, generate a fourth image signal based on the fourth information, and generate a sixth image based on the sixth information, and
   the optical processor is further configured to output a light beam to the image forming plane as seen in a plan view from the driver seat so as to display
   a left line segment object that is a line segment extending diagonally from a central portion in a left-right direction to a left side in a direction from an upper portion to a lower portion,
   a right line segment object disposed on a right side of the left line segment object and extending diagonally from the central portion to a right side in the direction from the upper portion to the lower portion,
   a first information object that is an object generated from the first image signal and disposed at a position along one of the left line segment object and the right line segment object on an outer side of the one of the line segment objects in the left-right direction,
   a second information object that is an object generated from the second image signal and disposed at a position along the one of the line segment objects on the outer side of the one of the line segment objects in the left-right direction, and diagonally above the first information object,
   a third information object that is an object generated from the third image signal and disposed at a position along an other line segment object different from the one of the left line segment object and the right line segment object on an outer side of the other line segment object in the left-right direction,
   a fourth information object that is an object generated from the fourth image signal and disposed at a position along the other line segment object on the outer side of the other line segment object in the left-right direction, and diagonally above the third information object, and
   a sixth information object that is an object generated from the sixth image signal and disposed at a position along the other line segment object on an outer side of the other line segment object in the left-right direction and diagonally below the third information object,
   wherein the image forming plane has a length in the vertical direction shorter than a length in the horizontal direction,
   wherein the first and third information objects corresponding to current or nearest road sign information and current or nearest route guidance information, respectively, the second and fourth information objects corresponding to road sign information following the current or nearest road sign information and route guidance information following the current or nearest route guidance information, respectively, and the sixth information object corresponding to the lane information that the vehicle uses to turn at an intersection are all displayed simultaneously on the image forming plane.

2. The head-up display device according to claim 1, wherein the controller is further configured to generate the first image signal and the second image signal so that the first information object is displayed in a form with higher visibility for a driver of the vehicle than the second information object on the image forming plane.

3. The head-up display device according to claim 2, wherein the controller is further configured to generate the first image signal and the second image signal so that the first information object is displayed with a larger size than the second information object on the image forming plane.

4. The head-up display device according to claim 3, wherein
   each of the first information object and the second information object includes at least one of a line segment of a straight line and a line segment of a curved line, and
   the controller is further configured to generate the first image signal and the second image signal so that the line segment of the first information object is displayed with a thicker line width than the line segment of the second information object on the image forming plane.

5. The head-up display device according to claim 1, wherein
   the first information and the second information are the driving-related information of the same type, and
   the third information and the fourth information are the driving-related information of the same type.

6. The head-up display device according to claim 1, wherein
   when the vehicle is a right-hand drive vehicle, the one of the line segment objects is the right line segment object, and the other line segment object is the left line segment object, and
   when the vehicle is a left-hand drive vehicle, the one of the line segment objects is the left line segment object, and the other line segment object is the right line segment object.

7. The head-up display device according to claim 6, wherein
   the controller is further configured to
   receive fifth information about presence or absence of a preceding vehicle as well as, if the preceding vehicle is present, an inter-vehicle distance from the preceding vehicle,
   generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

8. The head-up display device according to claim 1, wherein the controller is further configured to receive fifth information about presence or absence of a preceding vehicle as well as, if the preceding vehicle is present, an inter-vehicle distance from the preceding vehicle, generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

9. The head-up display device according to claim 2, wherein the controller is further configured to receive fifth information about presence or absence of a preceding vehicle as well as, if the preceding vehicle is present, an inter-vehicle distance from the preceding vehicle, generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

10. The head-up display device according to claim 3, wherein the controller is further configured to receive fifth information about presence or absence of a preceding vehicle as well as, if the preceding vehicle is present, an inter-vehicle distance from the preceding vehicle, generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

11. The head-up display device according to claim 4, wherein the controller is further configured to receive fifth information about presence or absence of a preceding vehicle as well as, if the preceding vehicle is present, an inter-vehicle distance from the preceding vehicle, generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

12. The head-up display device according to claim 6, wherein the controller is further configured to receive fifth information about presence or absence of a preceding vehicle as well as, if the preceding vehicle is present, an inter-vehicle distance from the preceding vehicle, generate a fifth image signal based on the fifth information, and the optical processor is further configured to output a light beam to the image forming plane as seen in the plan view from the driver seat so that a fifth information object is also displayed, the fifth information object being an object generated from the fifth image signal and disposed at a position between the left line segment object and the right line segment object.

* * * * *